(12) United States Patent
Makisumi

(10) Patent No.: US 11,732,778 B2
(45) Date of Patent: Aug. 22, 2023

(54) SPEED REDUCER

(71) Applicant: NABTESCO CORPORATION, Tokyo (JP)

(72) Inventor: Kazuyoshi Makisumi, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 17/470,810

(22) Filed: Sep. 9, 2021

(65) Prior Publication Data

US 2022/0082156 A1 Mar. 17, 2022

(30) Foreign Application Priority Data

Sep. 16, 2020 (JP) .................................. 2020-155333

(51) Int. Cl.
*F16H 1/32* (2006.01)
*F16H 49/00* (2006.01)
*F16C 3/18* (2006.01)

(52) U.S. Cl.
CPC .................. *F16H 1/32* (2013.01); *F16C 3/18* (2013.01); *F16H 49/001* (2013.01); *F16H 2001/323* (2013.01); *F16H 2049/003* (2013.01)

(58) Field of Classification Search
CPC ....... F16H 49/001; F16H 1/32; F16H 2001/323
See application file for complete search history.

(56) References Cited

U.S. PATENT DOCUMENTS 4,690,010 A * 9/1987 Matsumoto .......... B25J 17/0241
475/179
4,846,018 A * 7/1989 Matsumoto .............. B25J 9/102
475/179
5,161,290 A * 11/1992 Hashimoto .............. B23Q 5/10
74/819

FOREIGN PATENT DOCUMENTS

JP 2016-075354 A 5/2016

* cited by examiner

*Primary Examiner* — Jake Cook
(74) *Attorney, Agent, or Firm* — Pillsbury Winthrop Shaw Pittman, LLP

(57) ABSTRACT

A speed reducer according to one embodiment of the disclosure includes: a casing; a carrier disposed rotatably relative to the casing; a speed reduction mechanism that is disposed in the casing and reduces rotation inputted from a motor and outputs reduced rotation; and a bolt protruding from the carrier toward the outside of the casing. The bolt has a male threaded portion that is configured to engage with a female threaded portion provided in a second arm.

10 Claims, 4 Drawing Sheets

SPEED REDUCER

CROSS-REFERENCE TO RELATED APPLICATIONS

This application is based on and claims the benefit of priority from Japanese Patent Application Serial No. 2020-155333 (filed on Sep. 16, 2020), the contents of which are hereby incorporated by reference in their entirety.

TECHNICAL FIELD

The present disclosure relates to a speed reducer.

BACKGROUND

Industrial robots, for example, have a pair of arms rotatably coupled to each other. A motor unit is provided at a connection portion (joint) of the pair of arms to drive the arms. The motor unit includes a motor and a reducer connected to the motor. In the motor unit, a motor torque generated by rotation of the motor is reduced by the reducer and then outputted to the arm.

The reducer includes a casing and a carrier rotatably provided in the case. Tapped holes (female threaded hole) are formed in the carrier (see, for example, Japanese Patent Application Publication No. 2016-75354 ("the '354 Publication")). In the configuration of the '354 Publication, the arm is fixed to the carrier by bolts inserted into the tapped holes.

The tapped hole may be damaged if an excessive torque is applied to the tapped hole when fastening the bolt therein or if the bolt is repeatedly fastened thereto and removed therefrom. In the speed reducer described in the '354 Publication, the tapped holes are directly formed in the carrier itself. Therefore, if the tapped hole is damaged, the carrier itself has to be replaced to new one. In this way, it may take time or cost to repair the conventional speed reducers.

SUMMARY

The disclosure provides a speed reducer that can reduce the time and cost of repair work for the reducer. (1) A speed reducer according to one aspect of the disclosure includes: a casing; a speed reduction mechanism disposed in the casing and including a transmission portion, the speed reduction mechanism reducing rotation inputted from a drive source and outputting reduced rotation, the transmission portion being rotatable relative to the casing; and a bolt protruding from the transmission portion toward outside of the casing. The bolt has a male threaded portion that is configured to engage with a female threaded portion provided in a connection member.

According to the aspect, when repairing the transmission portion due to damage of the bolt and the like, the repair work can be completed by simply replacing the bolt after removing the connection member from the transmission portion. By providing the separate bolt in the transmission portion, it is possible to reduce the time and cost required for the repair work when the threaded portion is damaged, compared to the conventional configuration in which a female threaded portion is directly formed in the transmission portion.

(2) The bolt may include a head portion and a shaft portion. The shaft portion projects from the head portion and has the male threaded portion formed thereon. The transmission portion may have a bolt insertion hole that receives the head portion therein and allowing the shaft portion to protrude out from the transmission portion.

(3) The transmission portion may include: a main body extending in the casing along a rotational axis of the transmission portion; and a flange portion extending out from the main body in a radial direction of the rotational axis and facing the casing in a direction along the rotational axis. The bolt insertion hole may be formed in the flange portion.

(4) The bolt may be made of a material harder than the transmission portion.

(5) Internal teeth may be provided on an inner periphery of the casing. The speed reduction mechanism may include: a crankshaft connected to an input shaft of the drive source and having an eccentric portion that rotates eccentrically with respect to a rotational axis of the transmission portion; and an oscillating gear having external teeth that mesh with the internal teeth and rotating in the casing as the external teeth move over the internal teeth in conjunction with eccentric rotation of the eccentric portion. The transmission portion may rotate about the rotational axis as the oscillating gear rotates. The bolt may be disposed at a position of the transmission portion facing the oscillating gear in a direction along the rotational axis such that the male threaded portion protrudes from the transmission portion.

(6) Internal teeth may be provided on an inner periphery of the casing. The transmission portion may include: a body portion having external teeth that mesh with the internal teeth, the body portion being flexurally deformable in a radial direction that intersects a rotational axis of the transmission portion; and a flange portion extending out in the radial direction from the body portion and facing the casing in a direction along the rotational axis. The speed reduction mechanism may include a wave generator rotatably disposed inside the body portion, the wave generator changes a meshing position of the external tooth with the internal tooth in a circumferential direction around the rotation axis while the wave generator flexes and deforms the body portion in the radial direction as the wave generator rotates. The bolt may be fixed to the flange portion.

(7) A speed reducer according to another aspect of the disclosure includes: a circular spline having a cylindrical portion with internal teeth and a flange portion that extends out from the cylindrical portion; a flex spline having external teeth that mesh with the inner teeth, the flex spline rotatably disposed inside the cylindrical portion and being flexurally deformable in a radial direction of the cylindrical portion; a wave generator rotatably disposed inside the flex spline, the wave generator changes a meshing position of the external tooth with the internal tooth in a circumferential direction of the cylindrical portion while the wave generator flexes and deforms the flex spline in the radial direction as the wave generator rotates; and a bolt protruding from the flange portion toward an axial direction of the cylindrical portion, and fixed to the flange portion. The bolt has a male threaded portion that is configured to engage with a female threaded portion provided in a connection member.

According to this aspect, the bolt is provided in the flange portion of the circular spline. Therefore, when the circular spline is to be repaired due to damage of the bolt and the like, repair work can be completed simply by removing the connection member from the circular spline and replacing the broken bolt to new one. As a result, the time and cost required for the repair work can be reduced.

According to the aspects, the time and cost required for the repair work can be reduced.

DESCRIPTION OF THE EMBODIMENTS

Figure 1:
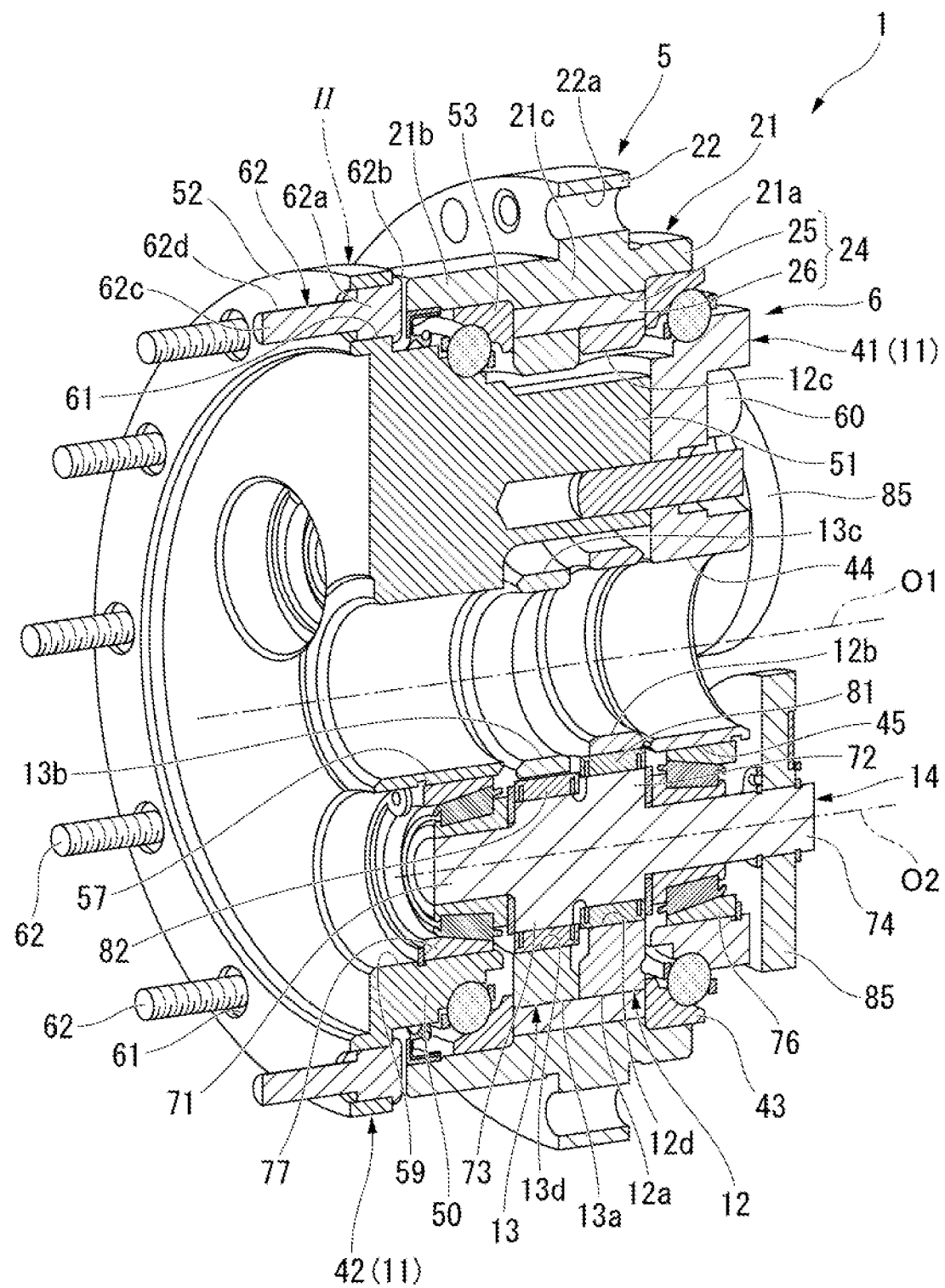
FIG. 1 is a perspective sectional view of a speed reducer according to a first embodiment.

The embodiments of the present disclosure will be hereinafter described with reference to the drawings. In the following description of the embodiments and modifications, the corresponding elements will be denoted by the same reference numerals and may not be repeatedly described. In the following description, such terms as "parallel," "orthogonal," "center" and "coaxial" may appear to describe relative or absolute positions. These terms are not only strictly used but also allow some tolerances and relative differences in angle and distance as long as the same effects can be still produced.

First Embodiment

<Speed Reducer 1>

FIG. 1 is a perspective sectional view of a speed reducer 1 according to a first embodiment. As shown in FIG. 1, the speed reducer 1 is provided at a connection portion (joint) between a pair of arms that are connected in an industrial robot, for example. The pair of arms are connected to each other such that they are rotatable. The speed reducer 1 decelerates a drive torque inputted from a motor (not shown) and outputs the decelerated torque.

The speed reducer 1 includes a casing 5 and a speed reduction mechanism 6.

<Casing 5>

The casing 5 includes a tube portion 21 and a case flange portion 22. In the following description, a direction along an axis O1 of the tube portion 21 is hereunder simply referred to as an axial direction, and a direction orthogonal to the axis O1 as viewed in the axial direction is referred to as a radial direction, and a circumferential direction about the axis O1 is simply referred to as a circumferential direction.

The tube portion 21 has a first region 21a situated on a first side in the axial direction, a second region 21b situated on a second side in the axial direction opposite to the first region 21a, and a middle region 21c situated between the first region 21a and the second region 21b. An inner diameter of the middle region 21c is smaller than that of the first region 21a and the second region 21b.

The middle region 21c has internal teeth 24 on an inner peripheral surface thereof. The internal tooth 24 includes a plurality of pin grooves 25 and internal tooth pins 26. The plurality of pin grooves 25 is formed on the inner periphery of the middle region 21c. The pin grooves 25 are open in the inner peripheral surface of the middle region 21c and extend in the axial direction. The pin grooves 25 are arranged in the circumferential direction at the same pitch. The internal tooth pins 26 are received in the respective pin grooves 25. Each of the internal tooth pins 26 is shaped like a column extending along the axial direction. The internal tooth pins 26 are received in the pin grooves 25 such that they partially protrude radially inward from the pin grooves 25. The internal tooth pins 26 are retained in the pin grooves 25 so as to be rotatable about respective axes parallel to the axis O1. The internal teeth 24 may be formed integrally with the tube portion 21.

A casing flange 22 protrudes outward in the radial direction from the middle region 21c. A plurality of through-holes 22a are formed in the casing flange 22. The through-holes 22a extend through the casing flange 22 in the axial direction. The through-holes 22a are arranged at intervals in the circumferential direction. A first arm (not shown) of the pair of arms, for example, is fixed to the casing flange 22. Bolts (not shown) are inserted into the through-holes 22a and through-holes formed in the first arm. The bolts are fastened to nuts to fix the casing flange 22 and the first arm. The through-hole 22a may be a female threaded hole to which the bolt is fastened.

<Speed Reduction Mechanism 6>

The speed reduction mechanism 6 includes a carrier (transmission portion) 11, two or more oscillating gears (a first oscillating gear 12 and a second oscillating gear 13), and two or more crankshafts 14.

The carrier 11 constitutes an output unit of the speed reducer 1. The carrier 11 is provided such that it is rotatable about the axis (rotational axis) O1 inside the casing 5. The carrier 11 includes a first block 41 and a second block 42. The first block 41 and the second block 42 are made of aluminum alloy, for example.

At least a part of the first block 41 is situated in the first region 21a. The first block 41 is shaped like a disc and is positioned coaxially with the axis O1. A bearing 43 is interposed between the outer peripheral surface of the first block 41 and the inner peripheral surface of the first region 21a. In this way, the first block 41 is supported on the casing 5 so as to be rotatable about the axis O1.

The first block 41 has a first through-hole 44 formed in the radially middle portion thereof. The first through-hole 44 extends through the first block 41 in the axial direction. In the periphery of the first block 41, there are formed a plurality of first shaft support holes 45. The first shaft support holes 45 are arranged at a distance from each other in the circumferential direction.

The second block 42 is positioned on the second side relative to the first block in the axial direction within the casing 5. The second block 42 includes a base plate 50, a support column 51, and a carrier flange 52. The base plate 50 is shaped like a disc and is positioned coaxially with the axis O1. At least a part of the base plate 50 is situated in the second region 21b. A bearing 53 is interposed between the outer peripheral surface of the base plate 50 and the inner peripheral surface of the second region 21b. In this way, the second block 42 is supported on the casing 5 so as to be rotatable about the axis O1.

The base plate 50 has a second through-hole 57 formed in the radially middle portion thereof. The second through-hole 57 extends through the base plate 50 in the axial direction. In the periphery of the base plate 50, there are formed a plurality of second shaft support holes 59. The second shaft support holes 59 each face the corresponding first shaft support holes 45 in the axial direction.

Each of the support columns 51 protrudes from a portion of the base plate 50 positioned between adjacent ones of the second shaft support holes 59 toward the first side in the axial direction. The support column 51 is opposed to the first block 41 in the axial direction and fixed thereto with a bolt 60 and the like. Thus, the first block 41 and the second block 42 rotate integrally about the axis 1 relative to the casing 5. The portions of the carrier 11 other than the carrier flange 52 form the main body of the carrier 11.

The carrier flange 52 protrudes outward in the radial direction from the portion of the base plate 50 that projects axially from the casing 5. The carrier flange 52 faces the second region 21b in the axial direction. The outer diameter of the carrier flange 52 is larger than the tube portion 21 and smaller than the casing flange 22. A plurality of bolt insertion holes 61 are formed in the carrier flange 52. The bolt insertion holes 61 extend through the carrier flange 52 in the axial direction. The bolt insertion holes 61 are arranged at intervals in the circumferential direction. A bolt 62 is held in the bolt insertion hole 61.

The bolts 62 are formed of a material that is harder than the second block 42, such as iron. The combination of the bolts 62 and the carrier 11 (second block 42) can be selected as appropriate if the hardness of bolt 62 is higher than that of the carrier 11. As the combination of the bolts 62 and the carrier 11, for example, the carrier 11 is made of a resin material and the bolts 62 are made of a metal material whose hardness is higher than the carrier 11.

Each of the bolts 62 has a head portion 62a, a flange portion 62b, and a shaft portion 62c. The bolt 62 is arranged with the tip of the shaft portion 62c facing the second side in the axial direction. The bolt 62 is inserted into the bolt insertion hole 61 from the first side in the axial direction against the carrier flange portion 52. Thus, the bolt 62 is axially facing the tube portion 21 at the radially outer side than the oscillating gears 12, 13.

The head portion 62a is received in the bolt insertion hole 61. An anti-rotation means may be provided or formed between the head portion 62a and an inner surface of the bolt insertion hole 61. To prevent the rotation, the head portion 62a and the bolt insertion hole 61 may be formed in a non-circular shape when viewed from the axial direction. Alternatively, as the anti-rotation means, splines that engage each other may be formed on an outer peripheral surface of the head portion 62a and the inner surface of the bolt insertion hole 61. The flange portion 62b protrudes from an end of the head portion 62a on the first end of the axial direction. The flange portion 62b faces the carrier flange portion 52 from the first side in the axial direction. The flange portion 62b restricts movement of the bolt 62 toward the second side in the axial direction relative to the carrier flange portion 52.

The shaft portion 62c projects from the head portion 62a toward the second side in the axial direction. The shaft portion 62c protrudes toward the second side in the axial direction from the carrier flange portion 52. A male threaded portion 62d is formed on the outer circumferential surface of the shaft portion 62c.

The bolt 62 may be press-fitted into the bolt insertion hole 61. When the second block 42 is formed of a resin material or the like, the bolt 62 may be integrally fixed to the second block 42 by insert molding or the like.

The first oscillating gear 12 and the second oscillating gear 13 are disposed inside the middle region 21c such that they overlap with each other in the axial direction. The first oscillating gear 12 and the second oscillating gear 13 each have an outer diameter slightly smaller than the inner diameter of the tube portion 21 (middle region 21c). The first oscillating gear 12 has external teeth 12a formed in the outer peripheral surface thereof. The second oscillating gear 13 has external teeth 13a formed in the outer peripheral surface thereof. Both the external teeth 12a of the first oscillating gear 12 and the external teeth 13a of the second oscillating gear 13 are in mesh with the internal teeth 24 (internal tooth pins 26). The respective numbers of the external teeth 12a, 13a are slightly smaller than the number of the internal tooth pins 26) (by one, for example). Alternatively, a single or three or more oscillating gears may be provided.

The first oscillating gear 12 has a first central hole 12b formed in the central portion thereof. The second oscillating gear 13 has a second central hole 13b formed in the central portion thereof. The central holes 12b, 13b each have an inner diameter substantially the same as the inner diameter of the first through-hole 44.

The first oscillating gear 12 has a plurality of first relief holes 12c formed in the outer periphery thereof. The first relief holes 12c are arranged at a distance from each other in the circumferential direction. The second oscillating gear 13 has a plurality of second relief holes 13c formed in the outer periphery thereof. The second relief holes 13c are arranged in the circumferential direction at the same pitch as the first relief holes 12c. Each of the relief holes 12c, 13c is penetrated by a respective corresponding one of the support columns 51. The relief holes 12c, 13c each have an inner diameter larger than the outer diameter of the support column 51. In this way, the operation of the oscillating gears 12, 13 are not prevented by the support columns 51.

In the periphery of the first oscillating gear 12, first passage holes 12d are formed between adjacent ones of the first relief holes 12c. In the periphery of the second oscillating gear 13, second passage holes 13d are formed between adjacent ones of the second relief holes 13c. Each of the passage holes 12d, 13d are arranged at the same pitch as the shaft support holes 45, 59.

The crankshafts 14 serve as a power transmission portion between the carrier 11 and the oscillating gears 12, 13. The crankshafts 14 pass through the corresponding shaft support holes 45, 59 and the passage holes 12d, 13d. The crankshafts 14 are bridged between the first block 41 and the base plate 50. Each of the crankshafts 14 includes a main shaft 71, a first eccentric portion 72, a second eccentric portion 73, and a protruding portion 74.

The main shaft 71 extends along an axis O2 that is parallel to the axis O1. The end portion of the main shaft 71 on the first side in the axial direction is supported via the bearing 76 so as to be rotatable in the first shaft support hole 45. The end portion of the main shaft 71 on the second side in the axial direction is supported rotatably via the bearing 77 in the second shaft support hole 59. The bearings 76, 77 may be, for example, angular bearings having cylindrical rollers as rolling elements.

The first eccentric portion 72 is formed at the portion of the main shaft 71 positioned in the first passage hole 12d. The first eccentric portion 72 is disposed eccentrically with respect to the axis O2 of the main shaft 71. The first eccentric portion 72 is supported rotatably via an eccentric portion bearing 81 in the first passage hole 12d. The second eccentric portion 73 is formed at the portion of the main shaft 71 positioned in the second passage hole 13d. The second eccentric portion 73 is disposed eccentrically with respect to the axis O2 of the main shaft 71. The second eccentric portion 73 is supported rotatably via an eccentric portion bearing 82 in the second passage hole 13d. The eccentric portions 72, 73 are out of phase around the axis O2 by 180°, for example.

The protruding portion 74 protrudes from the main shaft 71 toward the first side in the axial direction. A transmission gear 85 is mounted to the protruding portion 74. The input shaft of the motor (not shown) is directly or indirectly connected to the transmission gear 85. In other words, a motor torque is inputted to the speed reducer 1 via the transmission gear 85.

Figure 2:
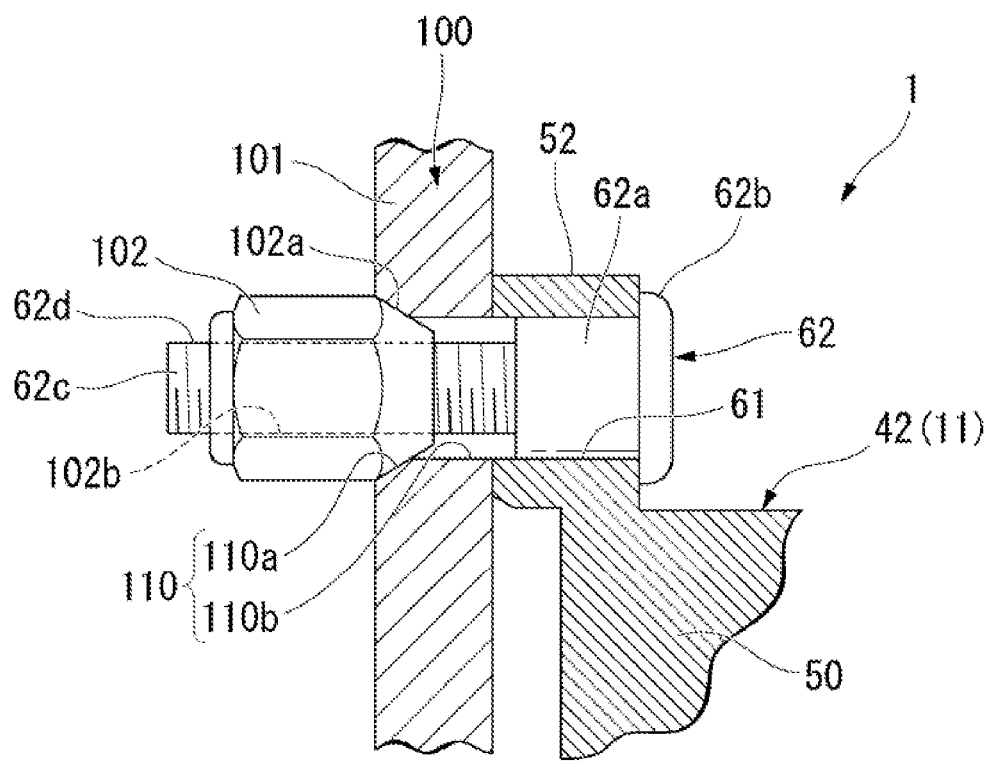
FIG. 2 is an enlarged view of the portion II of FIG. 1.

FIG. 2 is an enlarged sectional view of the portion II of FIG. 1. As shown in FIG. 2, a second arm 100 of the pair of arms is fixed to the carrier flange portion 52. Specifically, the second arm 100 includes a seat 101 facing the carrier flange portion 52 and a nut 102 seated on the seat 101. A through-hole 110 is formed in the seat 101 such that it extends in the axial direction through the seat 101. The through-hole 110 has a tapered portion 110a and a straight portion 110b. The inner diameter of the tapered portion 110a, for example, gradually decreases from the second side to the first side in the axial direction. The straight portion 110b extends from the tapered portion 110a toward the first side in the axial direction. The shaft portion 62c of the bolt 62 is inserted into the through-hole 110.

The nut 102 has a tapered portion 102a at the end thereof on the first side in the axial direction. The nut 102 is seated on the seat 101 with the tapered portion 102a fitted into the tapered portion 110a. A female threaded portion 102b is formed on an inner peripheral surface of the nut 102. The female threaded portion 102b is engaged with the male thread portion 62d of the shaft portion 62c. Thus, the second arm 100 is fixed to the carrier flange portion 52 by the nut 102 being fastened to the bolt 62 from the second side in the axial direction toward the second arm. The nut 102 and the through-hole 110 may be configured without the tapered portion as long as the bolt 62 can be fastened.

According to the configuration of the speed reducer 1 of this embodiment, a motor torque of the motor is inputted to the speed reduction mechanism 6 via the transmission gear 85. When the crankshafts 14 rotate in one direction by the torque transmitted to the transmission gear 85, the eccentric portions 72, 73 of the crankshafts 14 rotate eccentrically about the axis O2. This causes the oscillating gears 12, 13 to rotate about the axis O1 while oscillating in the casing 5 in accordance with the rotation of the eccentric portions 72, 73. Thus, the external tooth 12a, 13a of the oscillating gears 12, 13 move over the internal tooth pins 26 one by one as the oscillating gears 12, 13 rotate. The carrier 11 rotates about the first axis O1 in accordance with the rotation of the oscillating gears 12, 13. As a result, the motor torque of the motor is reduced by the speed reduction mechanism 6 and then outputted to an output member as the rotation of the carrier 11.

The torque generated by the rotation of the carrier 11 is transmitted to the second arm 100 via the bolt 62. This causes the second arm 100 to rotate about the axis O1 relative to the first arm.

As described above, the speed reducer 1 of this embodiment is configured to have the bolt 62 that protrudes from the carrier 11 to the outside of the casing 5 and is fastened to the female threaded portion 102b provided in the second arm 100. According to this configuration, when repairing the carrier 11 due to damage of the bolt 62, the repair work can be completed by simply replacing the bolt 62 after removing the second arm 100 from the carrier 11. As described above, by providing the separate bolt 62 in the carrier 11, it is possible to reduce the time and cost required for the repair work when the threaded portion is damaged, compared to the conventional configuration in which a female threaded portion is directly formed in the carrier 11. Moreover, by using the bolt 62 that is provided separately from the carrier 11, it is possible to reduce the load applied to the carrier 11 when it is fastened to the nut 102. This makes it easier to secure the fastening force between the bolt 62 and the nut 102. As a result, the second arm 100 can be stably attached to the speed reducer 1.

In the speed reducer 1 of this embodiment, the bolt insertion hole 61 is formed in the second block 42. The bolt insertion hole 61 accommodates the head 62a and the shaft portion 62c protrudes therefrom along the axis O1 toward the opposite side to the first block 41. According to this configuration, it is possible to prevent the head 62a from protruding from the second block 42 in the axis direction. Therefore, even when the bolts 62 are provided in the carrier 11, the size increase of the speed reducer 1 in the axial direction can be suppressed.

In the speed reducer 1 of this embodiment, the bolt insertion holes 61 are formed in the carrier flange portion 52 facing the tube portion 21 of the carrier 11. According to this configuration, there are fewer restrictions on the layout of the bolt insertion holes 61 compared to the case where the bolt insertion holes 61 are formed in the main body (base plate 50 or the like) of the carrier 11. Therefore, the degree of freedom in designing the bolt insertion holes 61 and bolts 62 is increased. In this case, it is easy to enhance the connection strength between the carrier 11 and the second arm 100 by increasing the number and nominal diameter of bolts 62.

In the speed reducer 1 of this embodiment, the bolts 62 are formed of a material harder than that of the carrier 11. Accordingly the strength of the bolts 62 are easily secured. Therefore, it is easier to secure the fastening force compared to the case where female threads are directly formed on the carrier 11.

Second Embodiment

Figure 3:
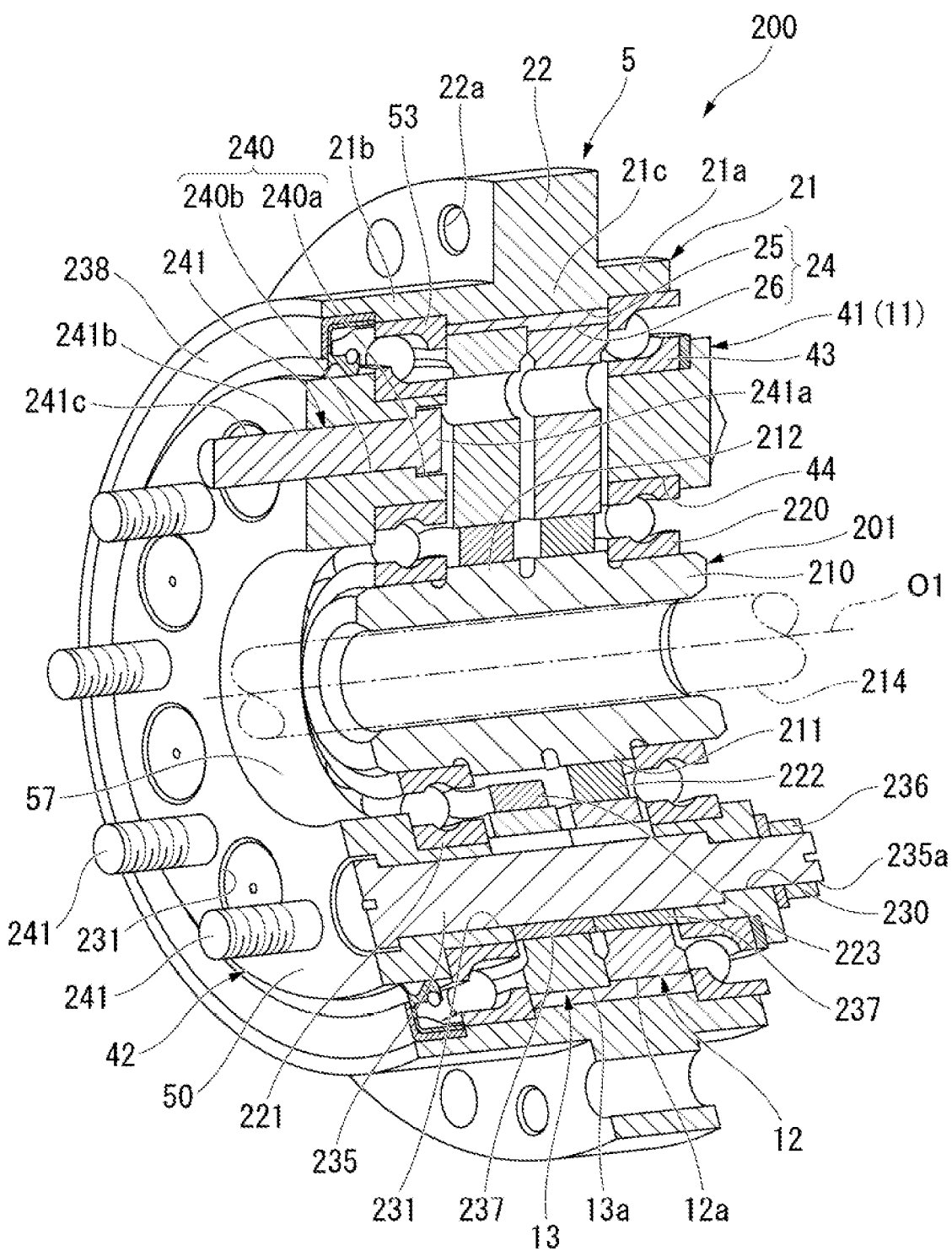
FIG. 3 is a perspective sectional view of a speed reducer according to a second embodiment.

FIG. 3 is a perspective sectional view of a speed reducer 200 according to a second embodiment. The speed reducer 200 according to the second embodiment differs from that of the first embodiment in that it employs a so-called center crank configuration. The center-crank type speed reducer 200 has a main shaft 210a of a crankshaft 201 disposed on the axis O1. In the speed reducer 200 of FIG. 3, the crankshaft 201 is bridged between the first block 41 and the second block 42 through the first through-hole 44, the first center hole 12b, the second center hole 13b, and the second through-hole 57.

The crankshaft 201 includes a main shaft 210, a first eccentric portion 211, and a second eccentric portion 212. The crankshaft 210 is a hollow circular shaft extending along the axis O1. One end of the main shaft 210 on the first side in the axial direction is supported rotatably via a bearing 220 in the first through-hole 44. The other end of the main shaft 210 on the second side in the axial direction is supported rotatably via a bearing 221 in the second through-hole 57. An input shaft 214 of the motor is fixed inside the main shaft 210. The input shaft 214 of the motor may be indirectly connected to the main shaft 210 via the speed reduction mechanism or the like.

The first eccentric portion 211 protrudes from a portion of the main shaft 210 situated in the first center hole 12b. The first eccentric portion 211 is disposed eccentrically with respect to the axis O1 of the main shaft 210. The first eccentric portion 211 is supported rotatably via an eccentric portion bearing 222 in the first central hole 12b. The second eccentric portion 212 protrudes from a portion of the main shaft 210 situated in the second center hole 13b. The second eccentric portion 212 is disposed eccentrically with respect to the axis O1 of the main shaft 210. The second eccentric portion 212 is supported rotatably via an eccentric portion bearing 223 in the second central hole 13b. The eccentric portions 211, 212 are out of phase around the axis O1 by 180°, for example.

In the outer periphery of the first block 41, there are formed two or more first pin insertion holes 230. The first pin insertion holes 230 are arranged at intervals in the circumferential direction. In the base plate 50 of the second block 42, two or more second pin insertion holes 231 are formed at the positions facing the first pin insertion holes 230 in the axial direction.

The first block 41 and the second block 42 are coupled by connecting pins 235. Each of the connecting pins 235 passes through the second pin insertion hole 231, the second passage hole 13d, the first passage hole 12d, and the first pin insertion hole 30 from the second side to the second block 42 in the axial direction. The connecting pin 235 has a male threaded portion 235a at the tip (at the end on the first side in the axial direction). The male threaded portion 235a protrudes from the first block 41 toward the first side in the axial direction. A nut 236 is fastened to the male threaded portion 235a. A collar 237 is disposed between an outer peripheral surface of the connecting pin 235 and an inner surface of the first passage hole 12d, and between the outer peripheral surface of the connecting pin 235 and an inner surface of the second passage hole 13d, respectively.

A seal ring 238 is disposed between the outer peripheral surface of the base plate 50 and the inner peripheral surface of the tube portion 21a. A bolt insertion hole 240 is formed in a portion of the outer periphery of the base plate 50 between adjacent two second pin insertion holes 231 in the circumferential direction. The bolt insertion hole 240 has a large-diameter portion 240a and a small-diameter portion 240b that is connected to the large-diameter portion 240a on the second side in the axial direction.

A bolt 241 is held in the bolt insertion hole 240. The bolt 241 is inserted into the bolt insertion hole 240 from the first side in the axial direction to the carrier flange portion 42. Each of the bolts 241 has a head portion 241a and a shaft portion 241b. The head portion 241a is received in the large-diameter portion 240a. The shaft portion 241b passes axially through the small-diameter portion 240b. A male thread 241c is formed on a portion of the shaft portion 241b that protrudes out from the second block 42. The male threaded portion 241c is fastened to a nut in the second arm.

In this embodiment, the bolt 241 is provided in the outer periphery portion of the base plate 50. Thus, the male threaded portion 241c is provided such that it protruding from the second block 42 at the position of the base plate 50 that faces the second oscillating gear 13 in the axial direction. As a result, a part of the bolt 241 (head portion 241a, etc.) is housed in the bolt insertion hole 240. Therefore, even when the bolts 241 are provided in the carrier 11, it is possible to suppress the size increase of the speed reducer 200 in the axial direction. Since the bolts 241 are arranged on the radially inner side relative to the case 5, so that it is also possible to suppress the radial size increase of the speed reducer 200.

Third Embodiment

Figure 4:
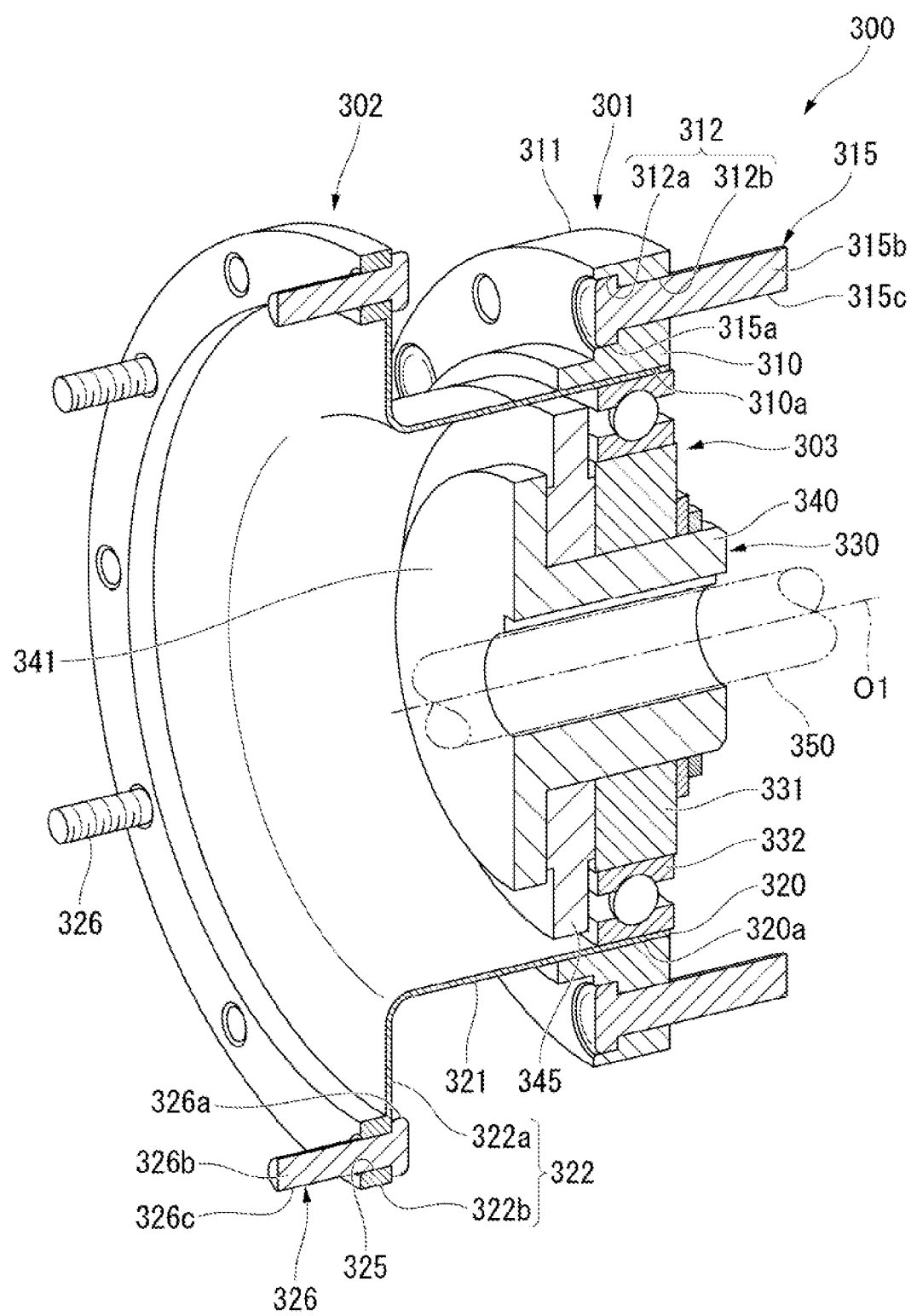
FIG. 4 is a perspective sectional view of a speed reducer according to a third embodiment.

FIG. 4 is a perspective sectional view of a speed reducer 300 according to a third embodiment. The third embodiment differs from the embodiments described above in that the speed reducer 300 is wave gearing. The reduction gear 300 shown in FIG. 4 has a circular spline (casing) 301, a flex spline 302, and a wave generator 303. The flex spline 302 and the wave generator 303 form the speed reduction mechanism.

The circular spline 301 has a rigidity so as to be deformable by external forces. In this embodiment, the circular spline 301 has a rigidity higher than at least that of the flex spline 302 (body portion 320 described below), and it is preferable that the circular spline 301 be most rigid among the components of the speed reducer 300.

The circular spline 301 has a cylindrical portion 310 and a first flange portion 311. The cylindrical portion 310 is disposed coaxially with the axis O1. Internal teeth 310a are formed on an inner circumferential surface of the cylindrical portion 310. The first flange portion 311 extends outward in the radial direction from the cylindrical portion 310. A plurality of bolt insertion holes 312 are formed in the first flange portion 311. The first bolt insertion holes 312 extend through the first flange portion 311 in the axial direction. The first bolt insertion holes 312 are arranged at intervals in the circumferential direction. The bolt insertion hole 312 each has a large-diameter portion 312a and a small-diameter portion 312b that is connected to the large-diameter portion 312a on the first side in the axial direction.

Bolts 315 are inserted into the first bolt insertion holes 312 from the second side in the axial direction. A head portion 315a of the bolt 315 is received in the large diameter portion 312a. A shaft portion 315b of the bolt 315 protrudes from the first flange portion 311 through the small diameter portion 312b toward the first side in the axial direction. A male threaded portion 315c is formed in a tip portion of the shaft portion 315b (the portion protruding from the first flange portion 311).

The first arm (not shown) of the pair of arms, for example, is fixed to the casing flange portion 311. Specifically, the first arm is fixed to the first flange portion 311 by fastening the male thread portions 315c of the bolts 315 to nuts (not shown). Female threaded portions to which the male threaded portions 315c are fastened may be directly formed in the first arm.

The flex spline 302 is formed in a hat shape when viewed in section in the axial direction. The flex spline 302 has a body portion 320, a neck portion 321, and a second flange portion 322. The body portion 320 and the neck portion 321 are examples of the "cylindrical portions." The body portion 320 is disposed on an inner side of the cylindrical portion 310. The body portion 320 is formed in an annular shape when viewed in the axial direction. The circumference of the body portion 320 at its outer periphery is shorter than the circumference of the cylindrical portion 310 at its inner periphery. External teeth 320a are formed on the outer peripheral surface of the body portion 320. The external teeth 320a mesh with the internal teeth 310a. The number of the external tooth 320a is slightly less than the number of the internal tooth 310a.

The body portion 320 is configured to be deformable in the radial direction. The body portion 320 is deformed, by a pressing force acting in a first radial direction of the body portion 320, into an elliptical shape whose major axis extends in the first radial direction and whose minor axis extends in a second direction orthogonal to the first radial direction. A portion of the external teeth 320a that overlap the major axis and a portion therearound engage the internal teeth 310a when the body portion 320 is deformed into the elliptical shape.

The neck portion 321 is formed in a cylindrical shape that is connected to the body portion 320 and extends toward the second side in the axial direction. The neck 321 protrudes from the cylindrical portion 310 of the circular spline 301 toward the second side in the axial direction. The flex spline 302 may have the neck portion 321 that is not deformable, as long as at least the body portion 320 is configured to be flexurally deformable.

The second flange portion 322 extends radially outward from an edge of the neck portion 321 on the second side in the axial direction. It is preferable that the second flange portion 322 have a hardness higher than that of the body portion 320. The second flange portion 322 has a thin-walled portion 322a situated at the inner periphery thereof, and a thick-walled portion 322b situated at the outer periphery thereof and connected to the thin-walled portion 322a. The thick-walled portion 322b has a larger axial dimension than the thin-walled portion 322a. In the illustrated example, at least the thick-walled portion 322b of the second flange portion 322 is situated radially outer than the first flange portion 311.

A plurality of bolt insertion holes 325 are formed in the second flange portion 322. The bolt insertion holes 325 extend through the second flange portion 322 in the axial direction. The second bolt insertion holes 325 are arranged at intervals in the circumferential direction. Bolts 326 are inserted into the second bolt insertion holes 325 from the first side in the axial direction. A head portion 326a of each bolt 326 is butted against the thick-walled portion 322b from the second side in the axial direction. A shaft portion 326b of the bolt 326 protrudes from the second flange portion 322 through the second bolt insertion hole 325 toward the second side in the axial direction. A male threaded portion 326c is formed in a tip portion of the shaft portion 326b (the portion protruding from the second flange portion 322).

The first arm (not shown) of the pair of arms, for example, is fixed to the second flange portion 322. Specifically, the second arm is fixed to the second flange portion 322 by fastening the male threaded portions 326c of the bolts 326 to nuts (not shown). Female threaded portions to which the male threaded portions 326c are fastened may be directly formed in the second arm.

The wave generator 303 includes a hub 330, a plug 331, and a wave bearing 332. The hub 330 includes a connecting shaft 340 and a hub flange portion 341. The connecting shaft 340 is a hollow shaft disposed coaxially with the axis O1 inside the circular spline 301 (cylindrical portion 310). The input shaft 350 of the motor is fixed to the connecting shaft 340. The hub flange portion 341 extends radially outward from an end of the connecting shaft 340 on the second side in the axial direction. The hub flange portion 341 is situated on the second side in the axial direction with respect to the cylindrical portion 310.

The plug 331 is situated on the first side in the axial direction with respect to the hub flange portion 341 inside the cylindrical portion 310. The plug 331 is formed in an elliptical shape centered on the axis O1 when viewed from the axial direction. The plug 331 is connected to the hub flange portion 341 via an Oldham coupling 345. The Oldham coupling 345 is disposed between the plug 331 and the hub flange portion 341. The Oldham coupling 345 is coupled to the plug 331 and the hub flange portion 341 in a radially movable manner via a key and keyway. The plug 331 is configured to be rotatable about the axis O1 in accordance with rotation of the hub 330, as the Oldham coupling 345 moves in the radial direction with the rotation of the hub 330.

The wave bearing 332 is mounted between an outer periphery of the plug 331 and an inner periphery of the body portion 320. The wave bearing 332 is configured to flex and deform in conjunction with the rotation of the plug 331. In other words, the orientation of its major axis of the wave bearing 332 gradually changes around the axis O1 as the plug 331 rotates.

In the speed reducer 300 of this embodiment, the rotational force of the hub 330 is transmitted to the plug 331 via the Oldham coupling 345, causing the plug 331 to rotate about the axis O1. This changes the orientation of the long axis of the wave bearing 332. The body portion 320 is pressed radially outward by the wave bearing 332, causing it to flex and deform in the radial direction. The external teeth 320a formed on the body portion 320 mesh with the inner teeth 310a as the body portion 320 flexes and deforms in the radial direction. As the orientation of the major axis of the wave bearing 332 changes, the external tooth 320a sequentially moves over the subsequent internal tooth 310a and meshing takes place. Thus, the flex spline 302 rotates about the axis O1 while the meshing position between the internal tooth 310a and the external tooth 320a changes in the circumferential direction.

In the speed reducer 300 of this embodiment, the bolts 315 are provided in the first flange portion 311 of the circular spline 301. Therefore, when the circular spline 301 is to be repaired due to damage of the bolt 315 or the like, repair work can be completed simply by removing the first arm from the circular spline 301 and replacing the broken bolt 315 to new one. In the speed reducer 300 of this embodiment, the bolts 326 are provided in the second flange portion 322 of the flex spline 302. Therefore, when the flex spline 302 is to be repaired due to damage of the bolt 326 or the like, repair work can be completed simply by removing the second arm from the flex spline 302 and replacing the broken bolt 326 to new one. As a result, the time and cost required for the repair work when the threaded portion is damaged can be reduced.

In the third embodiment described above, the configuration in which the bolts 315, 326 are provided on each of the flange portions 311, 322 have been described. However, the invention is not limited to this configuration. The bolts may be provided only one of the flange portion 311 or the flange portion 322 or both in the speed reducer 300. In the above-described embodiment, the flex spline 302 is formed in the hat shape. Alternatively the flex spline 302 may be formed in a cup shape. In the cup shaped flex spline 302, the opening of the neck portion 321 is closed.

Other Modifications

The preferred embodiments described above do not limit the invention. The embodiments can be modified by adding, omitting and replacing some or all of the features without departing from the scope of the invention. The invention is not limited by the above description but only by the appended claims. In the embodiments above, an arm of an industrial robot has been described as an example of the connection member provided therein, but the configuration is not limited to this. The connection member may be an arm of industrial equipment (e.g., construction machinery, etc.).

The features described throughout this disclosure may be adequately replaced by known features or elements without departing from the spirit of the present invention, and the above-described modification examples may be appropriately combined.

What is claimed is:

1. A speed reducer comprising:
  a casing;
  a speed reduction mechanism disposed in the casing and including a transmission portion, the speed reduction mechanism reducing rotation inputted from a drive source and outputting reduced rotation, the transmission portion being rotatable relative to the casing; and
  a bolt protruding from the transmission portion toward outside of the casing, the bolt having a male threaded portion configured to engage with a female threaded portion provided in a connection member, wherein internal teeth are provided on an inner periphery of the casing,
wherein the speed reduction mechanism includes:
a crankshaft connected to an input shaft of the drive source and having an eccentric portion that rotates eccentrically with respect to a rotational axis of the transmission portion; and
an oscillating gear having external teeth that mesh with the internal teeth and rotating in the casing as the external teeth move over the internal teeth in conjunction with eccentric rotation of the eccentric portion,
wherein the transmission portion rotates about the rotational axis as the oscillating gear rotates,
wherein the transmission portion includes:
a first block disposed on a first side in a direction along the rotational axis with respect to the oscillating gear, and
a second block having a base plate disposed on a second side of the oscillating gear in the direction along the rotational axis and connected to the first block,
wherein the bolt is configured to pass through a portion of the base plate that faces the oscillating gear, wherein the bolt is configured to extend in the direction along the rotational axis from the first side to the second side without passing through the first block, and
wherein the male threaded portion of the bolt protrudes from the base plate toward the outside of the casing.

2. The speed reducer of claim 1, wherein the bolt includes a head portion and a shaft portion, the shaft portion projecting from the head portion and having the male threaded portion formed thereon, and
wherein the transmission portion has a bolt insertion hole receiving the head portion therein and allowing the shaft portion to protrude out from the transmission portion.

3. The speed reducer of claim 2, wherein the transmission portion includes:
a main body extending in the casing along a rotational axis of the transmission portion; and
a flange portion extending out from the main body in a radial direction of the rotational axis and facing the casing in a direction along the rotational axis,
wherein the bolt insertion hole is formed in the flange portion.

4. The speed reducer of claim 1, the bolt is made of a material harder than the transmission portion.

5. The speed reducer of claim 1, wherein internal teeth are provided on an inner periphery of the casing,
wherein the transmission portion includes:
a body portion having external teeth that mesh with the internal teeth, the body portion being flexurally deformable in a radial direction that intersects a rotational axis of the transmission portion; and
a flange portion extending out in the radial direction from the body portion and facing the casing in a direction along the rotational axis,
wherein the speed reduction mechanism includes a wave generator rotatably disposed inside the body portion, the wave generator changes a meshing position of the external tooth with the internal tooth in a circumferential direction around the rotation axis while the wave generator flexes and deforms the body portion in the radial direction as the wave generator rotates, and
wherein the bolt is fixed to the flange portion.

6. The speed reducer of claim 2, the bolt is made of a material that is harder than the transmission portion.

7. The speed reducer of claim 3, wherein the bolt is made of a material that is harder than the transmission portion.

8. The speed reducer of claim 2, wherein internal teeth are provided on an inner periphery of the casing,
wherein the speed reduction mechanism includes:
a crankshaft connected to an input shaft of the drive source and having an eccentric portion that rotates eccentrically with respect to a rotational axis of the transmission portion; and
an oscillating gear having external teeth that mesh with the internal teeth and rotating in the casing as the external teeth move over the internal teeth in conjunction with eccentric rotation of the eccentric portion,
wherein the transmission portion rotates about the rotational axis as the oscillating gear rotates, and
wherein the bolt is disposed at a position of the transmission portion facing the oscillating gear in a direction along the rotational axis such that the male threaded portion protrudes from the transmission portion.

9. The speed reducer of claim 3, wherein internal teeth are provided on an inner periphery of the casing,
wherein the speed reduction mechanism includes:
a crankshaft connected to an input shaft of the drive source and having an eccentric portion that rotates eccentrically with respect to a rotational axis of the transmission portion; and
an oscillating gear having external teeth that mesh with the internal teeth and rotating in the casing as the external teeth move over the internal teeth in conjunction with eccentric rotation of the eccentric portion,
wherein the transmission portion rotates about the rotational axis as the oscillating gear rotates, and
wherein the bolt is disposed at a position of the transmission portion facing the oscillating gear in a direction along the rotational axis such that the male threaded portion protrudes from the transmission portion.

10. The speed reducer of claim 4, wherein internal teeth are provided on an inner periphery of the casing,
wherein the speed reduction mechanism includes:
a crankshaft connected to an input shaft of the drive source and having an eccentric portion that rotates eccentrically with respect to a rotational axis of the transmission portion; and
an oscillating gear having external teeth that mesh with the internal teeth and rotating in the casing as the external teeth move over the internal teeth in conjunction with eccentric rotation of the eccentric portion,
wherein the transmission portion rotates about the rotational axis as the oscillating gear rotates, and
wherein the bolt is disposed at a position of the transmission portion facing the oscillating gear in a direction along the rotational axis such that the male threaded portion protrudes from the transmission portion.

* * * * *